(12) United States Patent
Tanabe

(10) Patent No.: US 7,202,779 B2
(45) Date of Patent: Apr. 10, 2007

(54) ILLUMINATING SYSTEM

(75) Inventor: Tetsuo Tanabe, Aichi (JP)

(73) Assignee: Toyoda Gosei, Co., Ltd., NiShikasugai-gun, Aichi-ken (JP)

( * ) Notice: Subject to any disclaimer, the term of this patent is extended or adjusted under 35 U.S.C. 154(b) by 44 days.

(21) Appl. No.: 10/428,925

(22) Filed: May 5, 2003

(65) Prior Publication Data
US 2003/0227778 A1 Dec. 11, 2003

(30) Foreign Application Priority Data
May 14, 2002 (JP) ............................ P2002-138088

(51) Int. Cl.
*B60Q 11/00* (2006.01)
(52) U.S. Cl. ..................... 340/458; 340/426.34; 701/36
(58) Field of Classification Search .................. 340/458
See application file for complete search history.

(56) References Cited

U.S. PATENT DOCUMENTS

| 5,406,171 | A | * | 4/1995 | Moody | ......................... 315/77 |
| 6,276,744 | B1 | * | 8/2001 | Huber et al. | ................. 296/155 |
| 6,785,595 | B2 | * | 8/2004 | Kominami et al. | ........... 701/36 |
| 2003/0133292 | A1 | * | 7/2003 | Mueller et al. | ............. 362/231 |
| 2003/0189165 | A1 | * | 10/2003 | Samuels et al. | ............ 250/221 |

FOREIGN PATENT DOCUMENTS

JP  2001-094675  4/2001

* cited by examiner

*Primary Examiner*—Daniel Wu
*Assistant Examiner*—George A. Bugg
(74) *Attorney, Agent, or Firm*—McGinn IP Law Group, PLLC

(57) ABSTRACT

An illuminating system includes illumination device adapted for being installed inside a car cabin, and an operation device being able to wirelessly operate illumination modes of the illumination device.

18 Claims, 1 Drawing Sheet

ILLUMINATING SYSTEM

The present application is based on Japanese Patent Application No. 2002-138088, which is incorporated herein by reference.

BACKGROUND OF THE INVENTION

1. Field of the Invention

The present invention relates to an illuminating system in use for a car cabin. More particularly, the invention relates to an illuminating system utilizing a wireless transmission.

2. Description of the Related Art

A conventional car-cabin illumination device, e.g., a room lamp as a typical example, is turned on and off by a switch located near the illumination device, an opening/closing of the door, or a keyless entry. Recently, lamps for illuminating passenger's feet, the scuff plate and the door knob, and the map lamp and the reading lamp come to be installed on the vehicle. Some of those illumination devices each have a function of presenting dramatic effects by use of fade-in and fad-out functions, in addition to a simple function of merely turning on and off the illumination, and much variety of illuminations successively appears on the stage of practical use. In addition, with the advent of a LED-basis, full color light source, an illumination device has also been developed which is capable of presenting illumination effects based on lights variously colored through adjustment of a color tone.

In the case of the illumination device having a high level of dramatic effect, a common practice is to install the switches for controlling and adjusting illumination modes of the illumination device on the installment panel, for convenience of their use. As the dramatic effect of the illumination device is higher in level, the illumination device requires a more sophisticated interface. The hazard warning lamp switches and operations switches for the air conditioner and the accoustic equipment, and others are arrayed on the instrument panel, and the instrument panel is limited in area. Accordingly, the number of switches allowed to be installed thereon is inevitably limited. This fact makes it difficult to incorporate a variety of illumination functions into the illumination device as desired. The illumination device having the enhanced dramatic effect as just mentioned has no direct relation to the original functions of the vehicle, viz., it is an additional function. Therefore, the priority level given to the necessity of installing the switches of such a illumination device on the installment panel is low.

SUMMARY OF THE INVENTION

Accordingly, an object of the present invention is to provide an illuminating system which is capable of illuminating an interior of the car cabin with a high level of dramatic effect, without complicating the installment panel of the vehicle.

To achieve the above object, there is provided an illuminating system comprising: an illumination device adapted for being installed inside a car cabin; and an operation device being able to wirelessly operate illumination modes of the illumination device.

With such an arrangement, illumination modes of the illumination device installed inside a car cabin are operated wirelessly. Therefore, there is no need of installing many switches for controlling the illumination modes of the illumination device on the installment panel, and hence, the installment panel is simplified in construction. Further, a freedom of not only installment panel design but also vehicle design is increased. This also leads to reduction of design man-hours. Wiring between the illumination device and the switches is also not needed, and the work of mounting the illumination device is simple and easy. Further, a designer may go ahead with the design work of the illuminating system independently of the design work of the installment panel. Accordingly, a variety of dramatic effects may be incorporated into the illuminating system to thereby present mixed and varied illuminations. And the reduction of the design main-hours is also achieved.

The user (passenger) can select, at his or her will, a desired illumination mode from those illumination modes. In this respect, a good convenience is secured in handling the illuminating system.

In the arrangement mentioned above, the illuminating system may arranged such that a plurality of illumination devices are controlled by use of one operation device. The arrangement so made eliminates the necessity of providing the operation device for each illumination device to thereby improve the convenience. A control unit having a wireless receiving unit (or a wireless transceiving unit), which is for controlling illumination modes of the illumination devices, maybe installed in the car cabin. In this case, the wireless receiving unit (or the wireless transceiving unit) receives illumination mode control data from the operation device, and illumination modes of the illumination devices are controlled in accordance with the received data. In such an arrangement, the data can be collectively received from the operation device. This results in simplification of the whole system configuration.

Examples of the illumination devices are room lamps, lamps for illuminating passenger's feet, door-knob illumination lamps, which are installed for securing a safety when he or she gets in and off the vehicle, a map lamp for assisting the passenger in reading a map, and various lamps installed on the ceiling or the like for the purpose of decorating the interior of the car cabin. The types of light sources used for those illumination devices are not limited in particular. For example, LEDs, bulbs, fluorescent lamps, and cold-cathode tubes maybe used for the light sources. Above all, use of the LEDs is preferable. The LED is small in size, and needs a less space for the light source installation. Accordingly, use of LEDs contributes to size reduction and thinning of the illumination device. The use of the LEDs fulfills the demand of energy saving since the power consumption of them is small. Further, the LED has a small heating value, so that it less affects its members around it. Accordingly, the illumination device may be designed to be compact, and a freedom of mounting the illumination device is increased. Further, the LED is long in service life. This feature is advantageous in the light of maintenance. Furthermore, the LED is resistant to vibration and impact. This feature provides a reliable illumination device. Additionally, a response speed of the LED is high. Therefore, the turning on and off of the LED, luminance adjustment, a change of emitting light color (when a LED capable of emitting lights of at least two colors is used) are easily and instantaneously performed. By utilizing such LED characteristics, various illumination modes may be created. A type of the LED is not limited, and any of various types of LEDs, such as a shell-type of LED and a chip-type of LED, may be used.

Preferably, the operation device is connected to a communication network or an information processing device, such as a personal computer, and an illumination mode operation software for controlling illumination modes of the illumination device may be introduced into the operation device through the communication network or the personal computer. If so arranged, an illumination mode operation software may be introduced into the operation device, from the communication network as the necessity arises. In other words, illumination modes operable by the operation device may be added later. With this feature, a variation of the illumination modes may be increased without changing the illumination device side construction. The term "communication network" as used here includes various types of communication networks provided limitedly for a small number of users, intranets, and others, in addition to the internet. The term "information processing device" includes personal computers (including both desktop and the laptop computers), portable information terminals, such as a PDA (personal digital assistance), and the like.

Communication means used for the wireless communication between the operation device and the illumination device is not limited to specific ones. For example, Bluetooth™ (Bluetooth SIG Inc.) may be used for the communication means. Use of such a simple wireless function is advantageous in that it is low in price. Where the Bluetooth™ is used, a short distance communication is possible at a high level of security. Where the Bluetooth™ is used, a high level of compatibility with other devices is secured. Accordingly, the operation device of the invention may be used as an operation device of other devices (inclusive of the devices installed on the vehicle and used outside the vehicle).

A portable information processing terminal or a portable communication terminal may be used for the operation device. Specific examples of them are a PDA, a laptop personal computer, a portable telephone set, and PHS. Utilization of such an existing device improves user's convenience. In particular, those users who own the portable communication terminals do not need to buy new interface devices. A dedicated operation device may be used, as a matter of course. In this case, the following advantages are present: functions may be incorporated into the operation device as desired, and a design freedom of designing the user interface is increased.

The present invention will be described in detail by using specific embodiments.

DETAILED DESCRIPTION OF THE PREFERRED EMBODIMENTS

Figure 1:
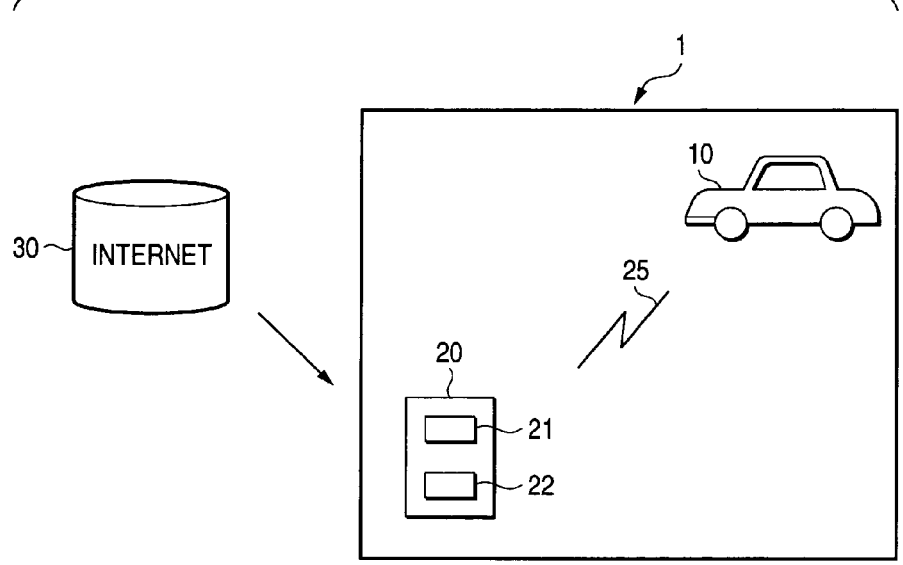
FIG. 1 is a diagram showing, in a model form, an illuminating system 1 which is an embodiment of the invention.
Figure 2:
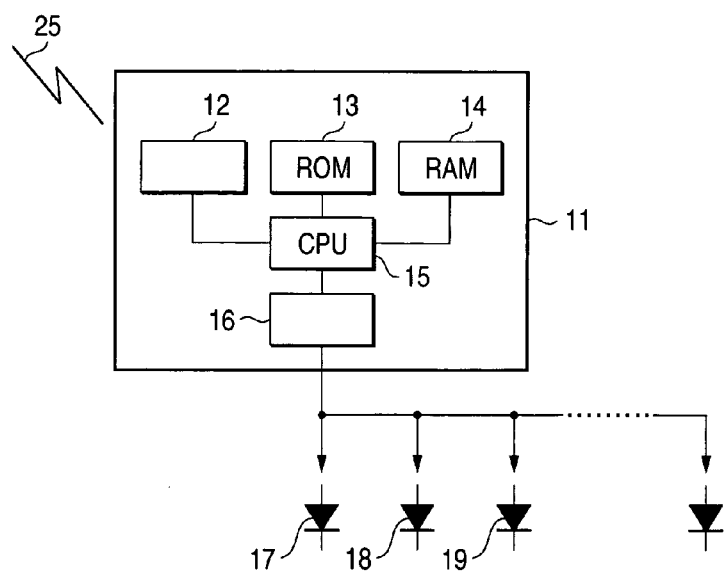
FIG. 2 is a block diagram showing an electrical configuration within a car cabin in the illuminating system 1.

FIG. 1 is a diagram showing, in a model form, a configuration of an illuminating system 1 which is an embodiment of the present invention. FIG. 2 is a block diagram showing an electrical configuration of the illuminating system 1 inside a car cabin. The illuminating system 1 of the invention is generally made up of an illumination controller 11 installed inside a vehicle 10, various illumination devices (room lamp 17, a lamp 18 for illuminating passenger's feet, an illumination device 19 for illuminating an inside handle part, and others), and a PDA 20 as an operation device. The illumination controller 11, which is installed inside an installment panel, includes a wireless transceiving unit 12, a ROM (read only memory) 13, a RAM (random access memory) 14, a CPU 15, and an output interface 16. The ROM 13 stores illumination data and dramatic presentation data for executing various illumination modes of the illumination devices.

The PDA 20 contains a wireless transceiving unit 21 and a memory 22. The wireless transceiving unit 21 may be detachably attached to the PDA, if required. In other words, it may be post-attached to the PDA. The memory 22 of the PDA 20 stores a program (data) for operating various illumination modes (luminance, colors, illuminating time, illumination position, and the like) of the illumination devices. The program may be downloaded from a communication network 30 (internet in the embodiment) by the wireless transceiving unit 21 or installed from a personal computer. In the latter case, the user may install a desired program into the memory, from a media, such as CD-ROM or DVD-ROM) as is presented, for example, when he buys a car. The PDA 20 may be equipped with an external interface, such as a USB port. In this case, a desired program may be introduced into the PDA 20 through the external interface. A GUI (graphical use interface) is used for the programs executed in the PDA 20 to thereby provide good operability of the programs.

Through communication between the wireless transceiving unit 21 of the PDA 20 and the wireless transceiving unit 12 of the illumination controller 11, the illumination data and dramatic presentation data are read out and executed in the illumination controller 11. Specifically, to start, the user operates the PDA 20 to cause it to send data 25 to read out specific illumination data and dramatic presentation data. Such data is received by the wireless transceiving unit 12 of the illumination controller 11. Upon the receiving data, the illumination data or the dramatic presentation data is read out of the ROM 13 of the illumination controller 11, and temporarily stored in the RAM 14. Subsequently, the CPU 15 of the illumination controller 11 executes the data in the RAM 14, and the illumination modes of the illumination devices are controlled through the output interface 16. For example, color and luminance adjustments of light sources and fade-in and fade-out time adjustments in the illumination devices are individually carried out. If required, those illumination devices may be controlled in an interlocking manner.

Incidentally, the illumination devices may be turned on and off by use of the PDA 20. Alternatively, to do the same thing, switches which are exclusively used for turning on and off the illumination devices may be provided on the vehicle side.

While a plurality of illumination devices are controlled by a single illumination controller in the embodiment mentioned above, an illumination controller may be provided for each illumination device. In this case, the illumination controller may be incorporated into each illumination device.

It should be understood that the present invention is not limited to the embodiment description given above, but may variously be modified, altered and changed within the true spirits and scope of the invention.

The present invention may also be implemented as follows:

11. An illuminating system comprises a plurality of illumination devices adapted for being installed inside a car cabin and an operation device being able to wirelessly operate illumination modes of the plurality of illumination devices.

12. An illuminating system as defined in item 11, further comprising a control unit for controlling illumination modes of the plurality of illumination devices, the control unit having a wireless receiving unit, wherein the control unit receives illumination mode control data from the operation device to thereby control illumination modes of the plurality of illumination devices.

13. An illuminating system as defined in item 11 or 12, wherein the operation device maybe connected to a communication network or an information processing device, such, as a personal computer, and an illumination mode operation software for controlling illumination modes of the illumination devices may be introduced through the communication network or the information processing device.

14. An illuminating system as defined in any of items 11 to 13, wherein the operation device includes a simple wireless function.

15. An illuminating system as defined in any of items 11 to 14, wherein the operation device is a portable information processing terminal or a portable communication terminal.

21. An illuminating system comprising:
illumination devices installed inside a car cabin;
a control unit for controlling illumination modes of the illumination devices, the control unit having a wireless receiving unit; and
an operation device having a wireless transmitting unit and being able to transmit data for controlling illumination modes of the illumination devices to the control unit by use of the wireless transmitting unit.

22. An illuminating system comprising:
illumination device adapted for being installed inside a car cabin;
a control unit for controlling illumination modes of the illumination device, the control unit having a wireless transceiving unit; and
an operation device having a transceiving unit and being able to transmit data for controlling illumination modes of the illumination device to the control unit by use of the wireless transceiving unit.

23. An illuminating system as defined in item 21 or 22, wherein the operation device may be connected to a communication network or an information processing device, such as a personal computer, and an illumination mode operation software for controlling illumination modes of the illumination device may be introduced through the communication network or the information processing device.

24. An illuminating system as defined in any of items 21 to 23, wherein the operation device is a portable information processing terminal or a portable communication terminal.

31. An illuminating system as defined in any of items 11 to 15, and 21 to 31, wherein each of the illumination devices includes a LED as a light source.

41. A car-cabin illumination device comprising a wireless receiving unit.

42. A car-cabin illumination device comprising a wireless transceiving unit.

43. A car-cabin illumination device as defined in item 41 or 42, wherein the illumination device includes a LED as a light source.

What is claimed is:
1. An illuminating system comprising:
an illumination device adapted for being installed inside a car cabin; and
an operation device being able to wirelessly operate a plurality of illumination modes of said illumination device, for generating a dramatic lighting effect,
wherein said plurality of illumination modes comprises color adjustments of light sources, luminance adjustments and illumination position.

2. An illuminating system according to claim 1, further comprising:
a control unit for controlling said plurality of illumination modes of said illumination device, said control unit having a wireless receiving unit,
wherein said control unit receives illumination mode control data from said operation device to thereby control said plurality of illumination modes of said illumination device.

3. An illuminating system according to claim 1, wherein said operation device may be connected to at least one of a communication network and an information processing device, and
wherein an illumination mode operation software for controlling illumination modes of said illumination device may be introduced into said operation device trough one of said communication network and said information processing device.

4. An illuminating system according to claim 1, wherein said operation device comprises a wireless function.

5. An illuminating system according to claim 1, wherein said operation device comprises one of a portable information processing terminal and a portable communication terminal.

6. An operation device adapted for an illumination device for illuminating an interior of a car cabin by operating a plurality of illumination modes for generating a dramatic lighting effect, said operation device comprising a wireless communication unit,
wherein said plurality of illumination modes comprises color adjustments of light sources, luminance adjustments and illumination position.

7. An operation device according to claim 6, wherein said operation device is connected to at least one of a communication network and an information processing device, and
wherein an illumination mode operation software for controlling illumination modes of said illumination device may be introduced into said operation device through one of said communication network and said information processing device.

8. An operation device according to claim 6, wherein said operation device comprises a wireless function.

9. An operation device according to claim 6, wherein said operation device comprises one of a portable information processing terminal and a portable communication terminal.

10. The illuminating system according to claim 1, further comprising:
read only memory; and
a random access memory.

11. The illuminating system according to claim 10, wherein said read only memory stores illumination data and dramatic presentation data for executing said plurality of illumination modes.

12. The illuminating system according to claim 11, wherein said operation device comprises a memory that stores program data for operating said plurality of operation modes.

13. The illuminating system according to claim 1, wherein said illuminating device comprises a LED light source.

14. The illuminating system according to claim 1, wherein said plurality of illumination modes further comprises at least one of a fade-in time and a fade-out time.

15. An operation device according to claim 6, wherein said plurality of illumination modes comprises at least one of a fade-in time and a fade-out time.

16. An illuminating system comprising:
an illumination device adapted for being installed inside a car cabin; and
an operation device being able to wirelessly operate a plurality of illumination modes of said illumination device, for generating a dramatic lighting effect,
wherein said plurality of illumination modes comprises color adjustments of light sources, fade-in time and fade-out time.

17. An illuminating system comprising:
an illumination device adapted for being installed inside a car cabin; and
an operation device being able to wirelessly operate a plurality of illumination modes of said illumination device, for generating a dramatic lighting effect,
wherein said plurality of illumination modes comprises color adjustments of light sources, fade-in time, fade-out time, luminance adjustments and illumination position.

18. An illuminating system comprising:
an illumination device adapted for being installed inside a car cabin; and
an operation device being able to wirelessly operate a plurality of illumination modes of said illumination device, for generating a dramatic lighting effect,
wherein said plurality of illumination modes comprises color adjustments of light sources, and
wherein said illuminating system comprises:
a plurality of illumination devices; and
a plurality of control units, and
wherein one of said plurality of control units is incorporated into each of said plurality of illumination devices.

* * * * *